United States Patent
Lee

(10) Patent No.: US 9,720,532 B2
(45) Date of Patent: Aug. 1, 2017

(54) TOUCH PANEL AND DISPLAY DEVICE INCLUDING THE SAME

(71) Applicant: Samsung Display Co., Ltd., Yongin, Gyeonggi-do (KR)

(72) Inventor: Kyung Su Lee, Cheonan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 150 days.

(21) Appl. No.: 14/302,017

(22) Filed: Jun. 11, 2014

(65) Prior Publication Data

US 2015/0103264 A1    Apr. 16, 2015

(30) Foreign Application Priority Data

Oct. 11, 2013    (KR) .................. 10-2013-0120930

(51) Int. Cl.
   *G06F 3/041*    (2006.01)

(52) U.S. Cl.
   CPC .... *G06F 3/041* (2013.01); *G06F 2203/04103* (2013.01)

(58) Field of Classification Search
   CPC .......... G06F 3/041; G06F 3/045; G06F 3/043; G06F 3/044; G06F 3/046; G06F 2203/04103; G06F 1/181
   See application file for complete search history.

(56) References Cited

U.S. PATENT DOCUMENTS

| | | | | |
|---|---|---|---|---|
| 2013/0279089 A1* | 10/2013 | Chien | .................. | H05K 13/00 361/679.01 |
| 2014/0063361 A1* | 3/2014 | Lo | ............... | G06F 1/16 349/12 |
| 2014/0085549 A1* | 3/2014 | Lin | ............. | G06F 1/1601 349/12 |
| 2014/0322492 A1* | 10/2014 | Lin | ............. | G06F 1/181 428/166 |
| 2015/0021157 A1* | 1/2015 | Tsurusaki | ............. | G06F 3/041 200/600 |

FOREIGN PATENT DOCUMENTS

| | | |
|---|---|---|
| KR | 10-0445291 B1 | 8/2004 |
| KR | 10-0723636 B1 | 5/2007 |
| KR | 10-1162017 B1 | 6/2012 |
| KR | 10-1262252 B1 | 5/2013 |

* cited by examiner

*Primary Examiner* — Ibrahim Khan
(74) *Attorney, Agent, or Firm* — Knobbe Martens Olson & Bear LLP

(57) ABSTRACT

A touch panel and display device including the same are disclosed. In one aspect, the touch panel includes a substrate including a light transmission region and a peripheral region surrounding the light transmission region, a color print layer formed in the peripheral region, and an adhesive layer formed over the substrate and the color print layer. A touch sensor layer is formed over the adhesive layer and configured to sense a touch input. At least one groove is formed in the color print layer and extends from the light transmission region to the peripheral region.

11 Claims, 9 Drawing Sheets

TOUCH PANEL AND DISPLAY DEVICE INCLUDING THE SAME

CROSS-REFERENCE TO RELATED APPLICATION

This application claims priority from Korean Patent Application No. 10-2013-0120930 filed on Oct. 11, 2013 in the Korean Intellectual Property Office, and all the benefits accruing therefrom under 35 U.S.C. 119, the contents of which in its entirety are herein incorporated by reference.

BACKGROUND

Field

The described technology generally relates to a touch panel and a display device including the same.

Description of the Related Technology

Touch panels are input devices that receive touch input from a user to select content shown on the screen of an image display device using the user's finger or an object.

To this end, touch panels are typically formed on a front surface of the image display device and convert the contact position directly touched by the user's finger or the object into an electrical signal. Accordingly, the content selected at the contact position is sensed as an input signal.

Touch screen panels can replace traditional input devices such as a keyboard or a mouse, and thus are being employed in an increasingly wide variety of applications. In the standard touch panel, a color print layer is formed in a touch inactive region along the periphery of a touch active region. These color print layers block internal components, such as sensing lines formed under the touch inactive region, from being viewed by the user. Instead, the color print layer having a particular color is viewed in the peripheral region of the touch panel.

SUMMARY OF CERTAIN INVENTIVE ASPECTS

One inventive aspect is a touch panel including a color print layer and a display device including the touch panel.

Another aspect is a touch panel which can prevent bubbles from being generated between an adhesive layer and a transparent substrate.

Another aspect is a touch panel which can exhaust bubbles generated between an adhesive layer and a transparent substrate.

Another aspect is a display device including a touch panel which can prevent bubbles from being generated between an adhesive layer and a transparent substrate.

Another aspect is a display device including a touch panel which can exhaust bubbles generated between an adhesive layer and a transparent substrate.

Another aspect is a touch panel including a transparent substrate, a color print layer formed along an edge portion of the transparent substrate on one surface of the transparent substrate, an adhesive layer formed on the transparent substrate and the color print layer, a touch sensor layer formed on the adhesive layer, and a penetration groove penetrating the color print layer and connecting the inside of the edge portion with the outside of the edge portion.

Another aspect is a display device including a touch panel including a transparent substrate, a color print layer formed along an edge portion of the transparent substrate on one surface of the transparent substrate, an adhesive layer formed on the transparent substrate and the color print layer, a touch sensor layer formed on the adhesive layer, and a penetration groove penetrating the color print layer and connecting the inside of the edge portion with the outside of the edge portion, a display panel formed on the touch sensor layer, and a receiving container receiving the touch panel and the display panel.

Another aspect is a touch panel including a substrate including a light transmission region and a peripheral region surrounding the light transmission region, a color print layer formed in the peripheral region, an adhesive layer formed over the substrate and the color print layer, and a touch sensor layer formed over the adhesive layer and configured to sense a touch input, wherein at least one groove is formed in the color print layer and extends from the light transmission region to the peripheral region.

The color print layer can include a first color print layer and a second color print layer formed over the first color print layer. A cross-section of an inner edge of the first color print layer and an inner edge of the second color print layer can form a substantially stepped shape. The groove can penetrate the second color print layer. A bottom surface of the groove can be defined by a top surface of the first color print layer and a top surface and sidewalls of the groove can be formed in the second color print layer. The touch panel can further include a third color print layer formed over the second color print layer. The groove can penetrate the third color print layer. A bottom surface of the groove can be defined by a top surface of the second color print layer and a top surface and sidewalls of the groove can be formed in the third color print layer. The at least one groove can include a plurality of grooves.

Another aspect is a display device including a touch panel including a substrate including a light transmission region and a peripheral region surrounding the light transmission region, a color print layer formed in the peripheral region, an adhesive layer formed over the substrate and the color print layer, and a touch sensor layer formed over the adhesive layer, wherein at least one groove is formed in the color print layer and extends from the light transmission region to the peripheral region, a display panel formed over the touch sensor layer, and a case housing the touch panel and the display panel.

The color print layer can include a first color print layer and a second color print layer formed over the first color print layer. A cross-section of an inner edge of the first color print layer and an inner edge of the second color print layer can form a substantially stepped shape. The groove can penetrate the second color print layer. A bottom surface of the groove can be defined by a top surface of the first color print layer and a top surface and sidewalls of the groove can be formed in the second color print layer. The display device can further include a third color print layer formed over the second color print layer. The groove can penetrate the third color print layer. A bottom surface of the groove can be defined by a top surface of the second color print layer and a top surface and sidewalls of the groove are can be formed in the third color print layer.

Another aspect is a display device including a touch panel including a substrate including a light transmission region and a peripheral region surrounding the light transmission region, a color print layer formed in the peripheral region, and a touch sensor layer formed over the color print layer and the substrate and configured to sense a touch input, wherein at least one groove is formed in the color print layer and extends in a direction from the light transmission region to the peripheral region, and a display panel formed over the touch panel.

The color print layer can include a first color print layer and a second color print layer formed over the first color print layer, wherein the groove is formed in the second color print layer and wherein the height of the second color print layer is greater than that of the first color print layer. The width of the groove can be greater than the height of the color print layer.

According to at least one embodiment, bubbles can be prevented from being generated between an adhesive layer and a transparent substrate.

In addition, according to at least one embodiment, bubbles generated between an adhesive layer and a transparent substrate can be easily exhausted.

DETAILED DESCRIPTION OF CERTAIN INVENTIVE EMBODIMENTS

Figure 1:
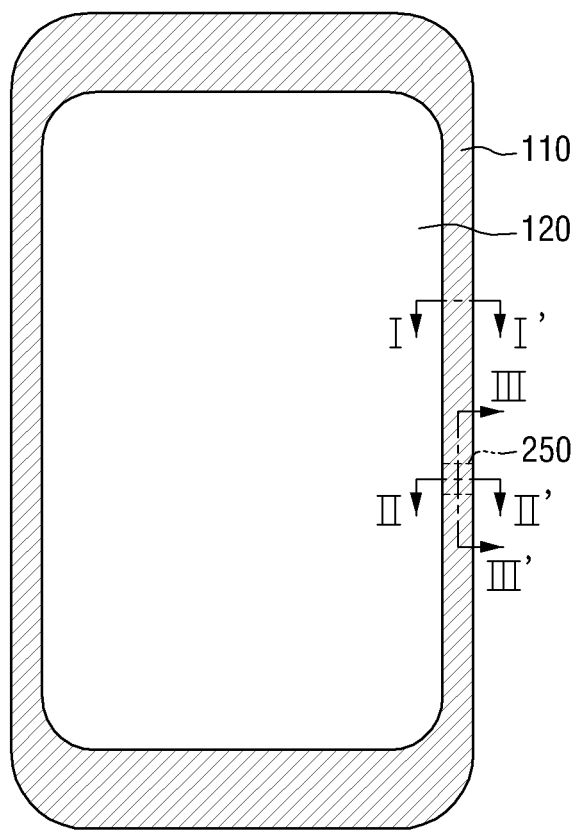
FIG. 1 is a plan view of a touch panel according to an embodiment.

Demand for display devices employing a touch panel having a peripheral region with various colors is increasing. Consequently, there is a growing demand for innovation in developing colored peripheral regions.

When multiple color print layers are formed for coloring the peripheral region, the total thickness of the color print layers increases. As the difference in height between a transparent substrate and the color print layer formed thereon increases, an adhesive layer formed over the color print layers and the transparent substrate may not entirely fill the corner formed between the color print layers and transparent substrate. Accordingly, bubbles are formed between the transparent substrate and the adhesive layer. Therefore, it can be important to remove generated bubbles when manufacturing a touch panel having a colored peripheral region.

The aspects and features of the described technology and methods for achieving the same will be apparent by referring to the embodiments described in detail with reference to the accompanying drawings. However, the described technology is not limited to the embodiments disclosed hereinafter, but can be implemented in various other forms. The matters defined in the description, such as the detailed construction and elements, are nothing but specific details provided to assist those of ordinary skill in the art in a comprehensive understanding of the described technology, and the described technology is only defined within the scope of the appended claims.

The term "on" is used herein to designate that an element is on another element or layer and refers to both when the element is located directly on the other element or layer and when the element is located on the other element or layer with yet another layer or element interposed therebetween. In the entire description, the same drawing reference numerals are used for the same elements throughout the figures.

Although the terms "first," "second," and so forth are used to describe the various constituent elements, such constituent elements are not limited by these terms. The terms are used only to differentiate one constituent element from other constituent elements. Accordingly, in the following description, a first constituent element may be termed a second constituent element without departing from the scope of the described technology. The term "substantially" as used in this disclosure can include the meaning of completely, almost completely, or to any significant degree in some applications and in accordance with the understanding of those skilled in the art.

Hereinafter, a touch panel according to an embodiment will be described with reference to FIGS. 1 to 4.

Referring to FIGS. 1 to 4, the touch panel 100 includes a transparent substrate or substrate 10 and a color print layer 200 formed along an edge portion 110 of the transparent substrate 10 on one surface of the transparent substrate 10. The touch panel 100 also includes an adhesive layer 300 formed on the transparent substrate 10 and the color print layer 200, a touch sensor layer 400 formed on the adhesive layer 300, and a penetration groove or groove 250 penetrating through the color print layer 200 and connecting the inside of the edge portion 110 to the outside of the edge portion 110.

The transparent substrate 10 is a transparent panel and can be formed of a transparent material, such as glass, polyethyleneterephtalate (PET) or acryl. The term "transparent" as used herein refers to both "fully transparent" meaning about 100% transmission of light and "semi-transparent" meaning partial transmission of light.

The transparent substrate 10 includes a display portion or light transmission region 120 and an edge portion or peripheral region 110 surrounding the outer circumference of the display portion 120.

The display portion 120 of the transparent substrate 10 may correspond to the display region of a display panel 500 having the display region and a non-display region. Images output from the display panel 500 are transmitted through the display portion 120 of the transparent substrate 10 so as to be observed by a user of the display device.

According to some embodiments, the display portion 120 has a substantially rectangular shape, but the described technology is not limited to the shape of the display portion 120 illustrated herein. According to other embodiments, the display portion 120 has a circular shape or an at least partially curved portion.

The edge portion 110 is formed along the outer circumference of the display portion 120. The edge portion 110 has a shape corresponding to the outer circumference of the display portion 120. Thus, when the display portion 120 has a substantially rectangular shape, the edge portion 110 also has a substantially rectangular shape formed along the outer circumference of the display portion 120. In some embodiments, when the display portion 120 has a substantially rectangular shape, the edge portion 110 has four sides corresponding to the sides of the display portion 120. For the sake clarity, the four sides of the edge portion 110 are respectively referred to as first to fourth sides. In the some embodiments, the first side faces the third side and the second side faces the fourth side. The widths of the first and third sides facing each other are substantially equal to each other, and similarly, the widths of the second and fourth sides are substantially equal to each other. The widths of the first side and the second side can be different from each other as shown in FIG. 1, which is provided only for illustration. The described technology is not limited thereto. In other embodiments, the widths of the first to fourth sides are substantially equal to each other.

The color print layer 200 is formed along the edge portion 110 on one surface of the transparent substrate 10.

The color print layer 200 is formed so as to correspond to a non-display region of the display panel 500, which will later be described. Accordingly, the color print layer 200 can cover various components, such as drivers, a printed circuit board, and so on, formed in the non-display region of the display panel 500, such that the components are hidden from view via the other surface of the transparent substrate 10.

Depending on the embodiment, the color print layer 200 can be formed of a single layer or a stacked structure of multiple layers. In FIGS. 1 to 4, the color print layer 200 is illustrated as including two layers, which is, however, provided only for illustration, and the described technology is not limit the structure of the color print layer 200 illustrated in FIGS. 1 to 4. Thus, in some embodiments, the color print layer 200 is formed of a single layer or a stacked structure of two or more stacked layers, which will later be described.

The color print layer 200 can be formed with any color without limitation. For example, the color print layer 200 can have various colors, including, for example, black, white, pink, or the like.

The penetration groove 250 is formed in the color print layer 200 to connect the inside of the edge portion 110 to the outside of the edge portion 110. The penetration groove 250 penetrates through the color print layer 200 and connects the inside of the edge portion 110 to the outside of the edge portion 110. Thus, the penetration groove 250 is formed through the color print layer in a direction from the display portion 120 to the edge portion 110. The penetration groove 250 is formed to be substantially parallel to one surface of the transparent substrate 10. One end of the penetration groove 250 extending in a substantially horizontal direction faces the display portion 120 and the other end of the penetration groove 250 faces away from the touch panel 100. When the penetration groove 250 is included in the touch panel 100 and connects the inside of the edge portion 110 to the outside of the edge portion 110, bubbles generated inside the touch panel 100, specifically between the adhesive layer 300 to be described later and the transparent substrate 10, can be exhausted to the environment through the penetration groove 250. Hereinafter, an embodiment of the penetration groove 250 will be described in detail with reference to FIGS. 2 to 4.

Figure 2:
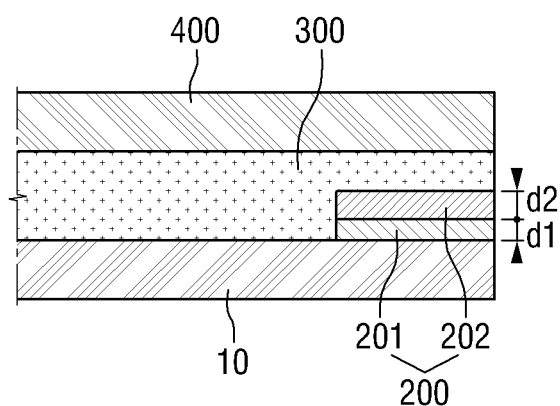
FIG. 2 is a cross-sectional view taken along the line I-I' of FIG. 1.
Figure 3:
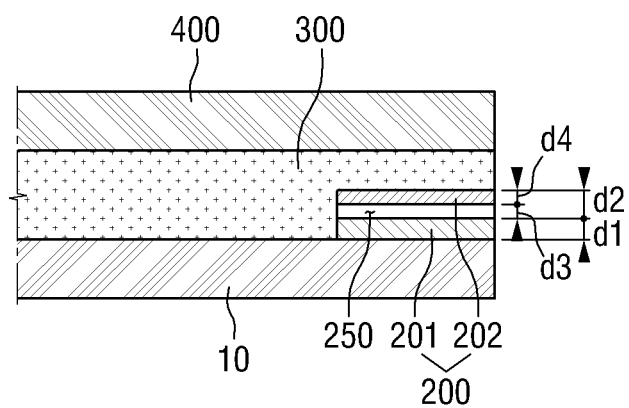
FIG. 3 is a cross-sectional view taken along the line II-II' of FIG. 1.

Referring to FIGS. 2 and 3, the penetration groove 250 is formed in a region of the color print layer adjacent to the edge portion 110. The number of penetration grooves is not limited. Thus, depending on the embodiment, the penetration groove 250 can be a single penetration groove or a plurality of penetration grooves. An embodiment where the penetration groove 250 includes a plurality of penetration grooves will be described later.

In the embodiment of FIGS. 2 and 3, a third height is in the range of about 1 µm to about 3 µm, which is, however, provided only for illustration. The height of the penetration groove 250 is not limited to the range of the third height described above.

Figure 4:
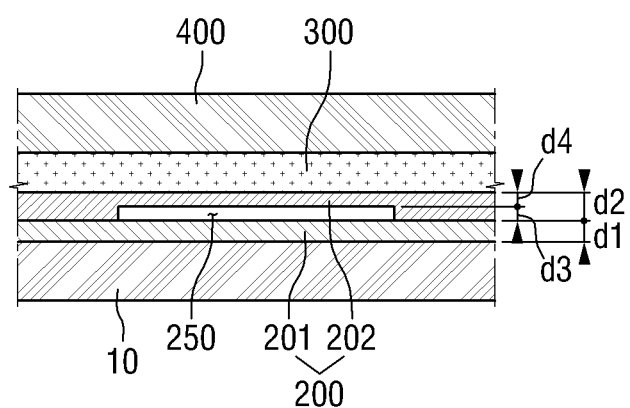
FIG. 4 is a cross-sectional view taken along the line III-III' of FIG. 1.

FIGS. 2 to 4 illustrate that the penetration groove 250 has a substantially rectangular cross-sectional shape; however, the cross-sectional shape of the penetration groove 250 is not limited thereto. That is to say, the penetration groove 250 can have a substantially circular or an at least partially curved cross-sectional shape.

FIGS. 2 to 4 illustrate that the penetration groove 250 penetrates through the second color print layer 202, but the position of the penetration groove 250 is not limited thereto. In some embodiments, the penetration groove 250 penetrates the first color print layer 201 and/or the second color print layer 202. In these embodiments, the bottom surface of the penetration groove 250 is formed in the first color print layer 201, the top surface of the penetration groove 250 is formed in the second color print layer 202, and the sidewalls of the penetration groove 250 are formed in both the first and second color print layers 201 and 202.

The adhesive layer 300 is formed on the transparent substrate 10 and the color print layer 200. In the embodiment including the second color print layer 202 formed on the first color print layer 201, the adhesive layer 300 covers a top surface of the second color print layer 202 and a top surface of the transparent substrate 10. The adhesive layer 300 attaches the touch sensor layer 400 to be described later to the transparent substrate 10. The adhesive layer 300 can be formed of a transparent and adhesive material. In some embodiments, the adhesive layer 300 is a tape-like optically clear adhesive (OCA), which is, however, described only as an example, but the adhesive layer 300 is not limited thereto.

The adhesive layer 300 has a greater thickness than the color print layer 200. As shown in FIGS. 2 to 4, the top surface of the adhesive layer 300 is substantially planar. In these embodiments, the thickness of the color print layer 200 is less than that of the adhesive layer 300, so that the top surface of the adhesive layer 300 is substantially planar.

When the adhesive layer 300 is an OCA, bubbles can be generated between the adhesive layer 300 and the transparent substrate 10, specifically, the bubbles can be generated adjacent to the color print layer 200, due to the step in height of the color print layer 200. As described above, when the penetration groove 250 is formed penetrating through the color print layer 200, bubbles generated between the adhesive layer 300 and the transparent substrate 10 can be exhausted through the penetration groove 250.

The touch sensor layer 400 is formed on the adhesive layer 300. The touch sensor layer 400 senses touch input applied to the other surface of the transparent substrate 10 and generates an input signal based on the touch input. In some embodiments, the touch sensor layer 400 senses the touch input using one of a capacitive, infrared, ultrasonic, and resistive method. These methods are, however, provided only as examples, the method used by the touch sensor layer 400 to sense touch input is not limited thereto.

Hereinafter, additional embodiments will be described. In the following description, the same functional components are denoted with the same reference numerals and repeated descriptions thereof will be omitted or only briefly presented.

Figure 5:
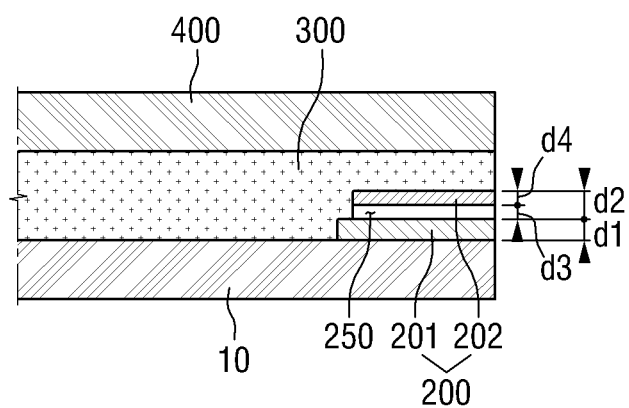
FIG. 5 is a cross-sectional view of a touch panel according to another embodiment.

FIG. 5 is a cross-sectional view of a touch panel according to another embodiment.

Referring to FIG. 5, the touch panel is different from the touch panel shown in FIG. 3 in that the inside edges of the first and second color print layers 201 and 202 are formed to have a substantially stepped cross-sectional shape.

As described above, the second color print layer 202 is formed on the first color print layer 201 and overlaps the first color print layer 201. The inner edges of the first and second color print layers 201 and 202 are formed to have a substantially step shape seen from a cross-sectional view. As shown in FIG. 5, the inner wall of the first color print layer 201 extend farther toward the interior of the edge portion than the inner wall of the second color print layer 202. In these embodiments, however, the outer wall of the first and second color print layers 201 and 202 are vertically aligned.

When the inside of the first color print layer 201 and the inside of the second color print layer 202 are formed to have a substantially stepped cross-sectional shape, the difference in height between the topmost surface of the color print layer 200 and the transparent substrate 10 has a more gradual transition, compared to when the inner wall of the first color print layer 201 and the inner wall of the second color print layer 202 are aligned. Consequently, the bubbles generated due to the difference in height between the color print layer 200 and the transparent substrate 10 can be reduced.

In the FIG. 5 embodiment, the penetration groove 250 is formed on the first color print layer 201 and penetrates through a portion of the second color print layer 202. Since the penetration groove 250 is substantially the same as that of the embodiment shown in FIGS. 1 to 4, a detailed description thereof will be omitted.

Figure 6:
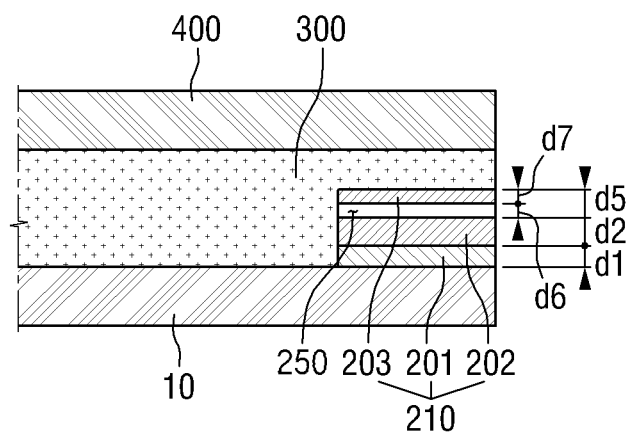
FIG. 6 is a cross-sectional view of a touch panel according to another embodiment.

FIG. 6 illustrate two cross-sectional views of a touch panel according to another embodiment.

Figure 7:
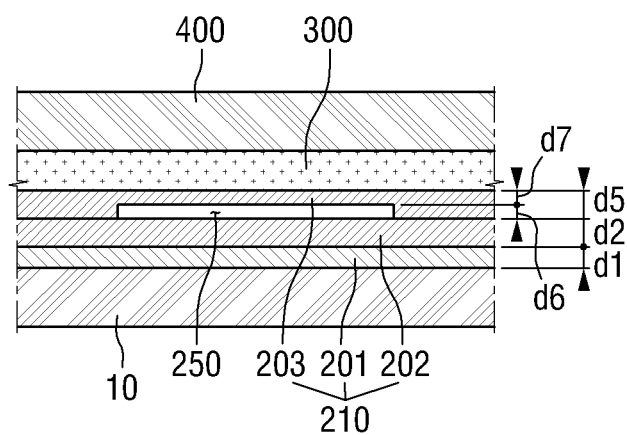
FIG. 7 is a cross-sectional view of the touch panel shown in FIG. 6.

Referring to FIGS. 6 and 7, the touch panel is different from the touch panel according to the embodiment shown in FIGS. 1 to 4, in that the color print layer 210 includes a first color print layer 201, a second color print layer 202, and a third color print layer 203.

As described above, the color print layer 210 can be formed to have a stacked structure including multiple stacked layers. In detail, the color print layer 210 can include the second color print layer 202 formed on the first color print layer 201 and the third color print layer 203 formed on the second color print layer 202.

The first to third color print layers 201 to 203, can have different colors, however, the described technology is not limited thereto. The first to third color print layers 201 to 203 can have the same color. Alternatively, one of the first to third color print layers 201 to 203 can have a different color from the other two color print layers.

Accordingly, depending on the embodiment, each of the first to third color print layers 201 to 203 can have various colors, but the described technology not limited thereto.

In some embodiments, each of the first to third color print layers 201 to 203 has a thickness in the range of about 5 µm to about 9 µm. In the FIG. 6 embodiment, the penetration groove 250 is formed on the second color print layer 202, however, this configuration is provided only as an example. As described above, the penetration groove 250 can be formed on the first color print layer 201. However, in the following description, the described technology will be described by way of example wherein the penetration groove 250 is formed on the second color print layer 202. The penetration groove 250 formed on the second color print layer 202 connects the inside and the outside of an edge portion 110 and extends substantially parallel to one surface of a transparent substrate 10.

In the embodiment of FIG. 6, the penetration groove 250 is formed penetrating through a portion of the third color print layer 203. That is to say, the bottom surface of the penetration groove 250 is formed in the second color print layer 202, and the sidewalls and top surface facing the bottom surface of the penetration groove 250 are formed in the third color print layer 203. In this embodiment, the height of the third color print layer 203 in regions where the penetration groove 250 is not formed, that is, a fifth height d5, is substantially equal to the sum of the height of the penetration groove 250, that is, a sixth height d6 and a height of the third color print layer 203 in the region where the penetration groove 250 is formed, that is, a seventh height d7.

In the FIG. 6 embodiment, the sixth height d6 is in the range of about 1 µm to about 3 µm, which is, however, provided only as an example, however, the described technology is not limited the height of the penetration groove 250 described above.

FIGS. 6 and 7 illustrate that the penetration groove 250 has a rectangular cross-section; however, the cross-sectional shape of the penetration groove 250 is not limited thereto. That is to say, the penetration groove 250 can have a circular or an at least partially curved cross-sectional shape.

FIGS. 6 and 7 illustrate that the penetration groove 250 penetrates through the third color print layer 203, but the position of the penetration groove 250 is not limited thereto. In some embodiments, although not shown, the penetration groove 250 can be formed penetrating through a portion of the second color print layer 202 and a portion of the third color print layer 203. In other embodiments, the penetration groove 250 penetrates through the first, second, and third color print layers 201 to 203 at the same time. When the penetration groove 250 penetrates a portion of the second and third color print layers 202 and 203, the bottom surface of the penetration groove 250 is formed in the second color print layer 202, the top surface of the penetration groove 250 is formed in the third color print layer 203, and the sidewalls of the penetration groove 250 are formed in the second and third color print layers 202 and 203. When the penetration groove 250 penetrates through the first to third color print layers 201 to 203, the bottom surface of the penetration groove 250 is formed in the first color print layer 201, the top surface of the penetration groove 250 is formed in the third color print layer 203, and the sidewalls of the penetration groove 250 are formed in each of the first, second, and third color print layers 201 to 203.

The adhesive layer 300 is formed on the third color print layer 203. The adhesive layer 300 covers the top surface of the third color print layer 203 and the top surface of the transparent substrate 10. The adhesive layer 300 is substantially the same as that according to the previous embodiment shown in FIGS. 1 to 4, and a detailed description thereof is omitted.

Figure 8:
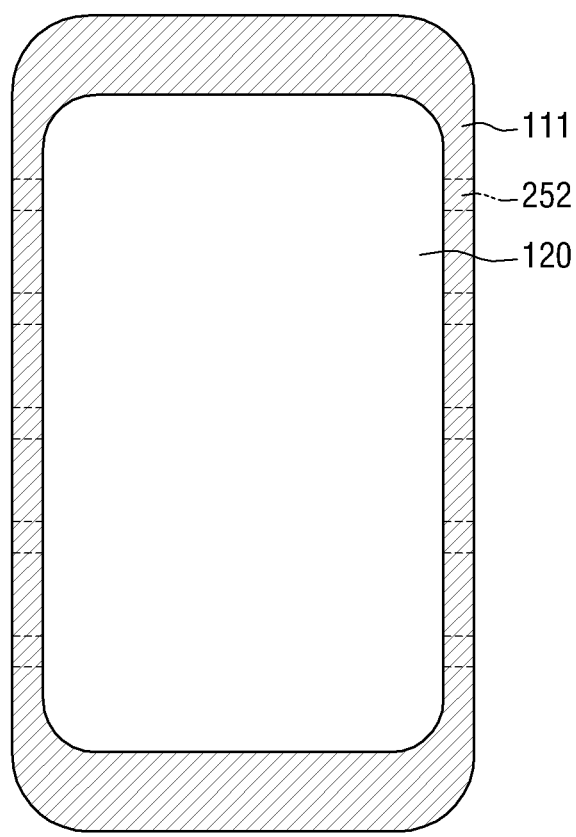
FIG. 8 is a plan view of a touch panel according to another embodiment.

FIG. 8 is a plan view of a touch panel according to another embodiment.

Referring to FIG. 8, the touch panel 101 is different from the touch panel 100 according to the embodiment shown in FIG. 1 in that a penetration groove 250 includes a plurality of penetration grooves.

In the touch panel 101 of FIG. 8, the penetration groove 250 includes a plurality of penetration grooves formed along an edge portion 110 of the transparent substrate 10. FIG. 8 illustrates that the penetration grooves 250 are formed in a first side and a third side of the edge portion 110 of the transparent substrate 10 and extend to be substantially parallel to a second side and a fourth side of the edge portion 110 of the transparent substrate 10. However, the described technology is not limited to the direction and number of the penetration grooves 250 as described herein. In other embodiments, the penetration grooves 250 are formed in the second and fourth sides and extend to be substantially parallel to the first and third sides of the touch panel 101. In addition, the number of penetration grooves 250 is not limited to the above description or the illustration of FIG. 8.

Figure 9:
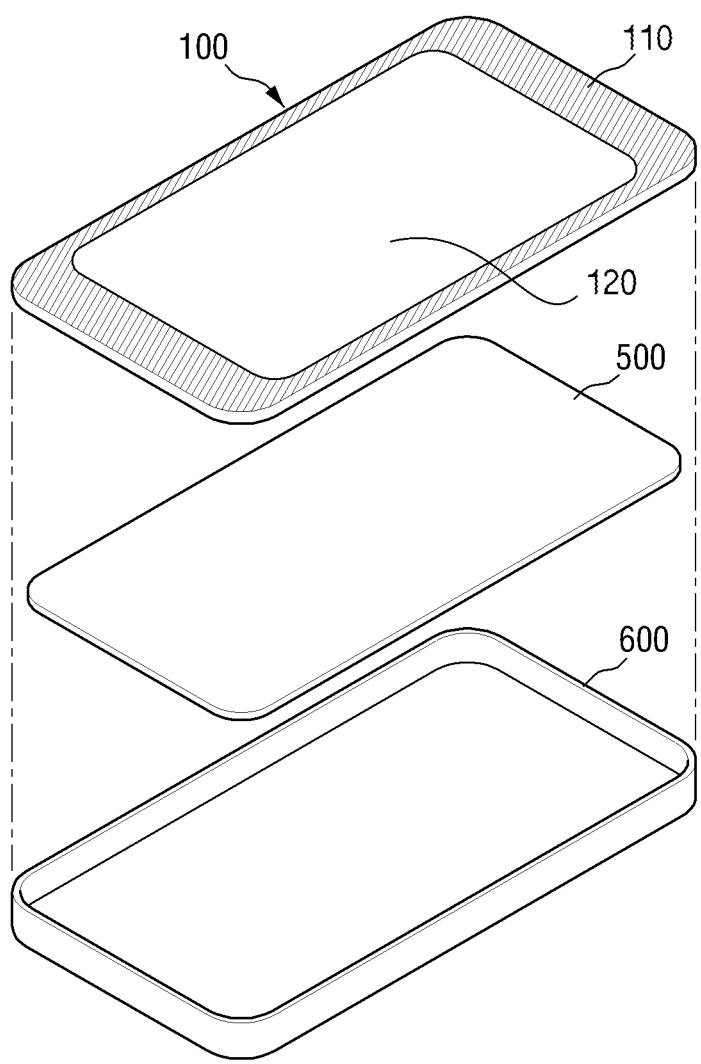
FIG. 9 is an exploded perspective view of a display device according to another embodiment.

FIG. 9 is an exploded perspective view of a display device according to another embodiment.

Referring to FIG. 9, the display device includes a receiving container or case 600, a display panel 500 housed in the receiving container 600 and including a plurality of pixels having colors varying according to electrical signals, and a touch panel 100 formed on the display panel 500. Here, the touch panel 100 includes a transparent substrate 10, a color print layer formed along an edge portion 110 of the transparent substrate 10 and on one surface of the transparent substrate 10. The touch panel 100 also includes an adhesive layer 300 formed on the transparent substrate 10 and the color print layer, a touch sensor layer 400 formed on the adhesive layer 300, and a penetration groove 250 penetrating through the color print layer and connecting the inside of the edge portion 110 to the outside of the edge portion 110.

The receiving container 600 houses the display panel 500 and the touch panel 100. In order to transmit the light generated by the display panel 500 through the touch panel 100, the receiving container 600 includes an open end at the top thereof. In addition, in the embodiment of FIG. 9 in which the touch panel 100 and the display panel 500 are rectangular, the receiving container 600 has a rectangular shape, but the described technology is not limited to the illustrated shape of the receiving container 600. The receiving container 600 can have various shapes and structures that are known in the related art depending on the embodiment. Thus, the described technology does not limit the kind or shape of the receiving container 600 to that described herein.

The display panel 500 displays images. The display panel 500 includes, for example, an organic light-emitting diode (OLED) display panel, a liquid crystal display (LCD) panel, a plasma display panel (PDP), an electrophoretic display (EPD) panel or an electrowetting display (EWD) panel, which are provided only as examples. The described technology is not limited to the display panels 500 described herein.

The display panel 500 includes a display region and a non-display region. In some embodiments, a plurality of pixels defined by the intersections between a plurality of data lines and a plurality of gate lines are formed in the display region. In addition, each of the pixels is driven by an electrical signal to emit light.

Driver ICs for driving the pixels in the display region are formed in the non-display region. The structure and driving method of the display panel 500 are obvious to one skilled in the art and detailed descriptions thereof will be omitted to avoid obscuring the scope of the described technology.

The touch panel 100 is formed on the display panel 500. As shown in FIG. 9, the display panel 500 is interposed between the touch panel 100 and the receiving container 600. In detail, the display panel 500 is formed on the touch panel 100. In the FIG. 9 embodiment, the touch sensor layer 400 of touch panel 100 contacts the display panel 500, however, the described technology is not limited thereto. Various intervening layers can also be formed between the touch panel 100 and the touch sensor layer 400.

The display panel 500 is interposed between the receiving container 600 and the touch panel 100. As described above, the display region of the display panel 500 is located in an area corresponding to the display portion 120 of the touch panel 100 and the non-display region of the display panel 500 is located in an area corresponding to the edge portion 110 of the touch panel 100.

When light is generated from the display region of the display panel 500, the light passes through the touch panel 100 to the environment. Accordingly, images displayed on the display device can be viewed by a user.

The touch panel can be substantially the same as any one of the touch panels according to embodiments of the described technology, and a detailed description thereof will be omitted.

While the inventive technology has been particularly shown and described with reference to exemplary embodiments thereof, it will be understood by those of ordinary skill in the art that various changes in form and details can be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A touch panel, comprising:
   a substrate including a light transmission region and a peripheral region surrounding the light transmission region;
   a color print layer formed in the peripheral region;
   an adhesive layer formed over the substrate and the color print layer; and
   a touch sensor layer formed over the adhesive layer and configured to sense a touch input,
   wherein at least one groove is formed in the color print layer and extends from the light transmission region to the peripheral region,
   wherein the color print layer includes a first color print layer and a second color print layer formed over the first color print layer,
   wherein the groove penetrates the second color print layer, and
   wherein a bottom surface of the groove is defined by a top surface of the first color print layer and a top surface and sidewalls of the groove are formed in the second color print layer.

2. The touch panel of claim 1, wherein a cross-section of an inner edge of the first color print layer and an inner edge of the second color print layer form a substantially stepped shape.

3. The touch panel of claim 1, wherein the at least one groove includes a plurality of grooves.

4. The touch panel of claim 1, wherein the groove continuously extends from the light transmission region to an external edge of the peripheral region.

5. A touch panel comprising:
   a substrate including a light transmission region and a peripheral region surrounding the light transmission region;
   a color print layer formed in the peripheral region;
   an adhesive layer formed over the substrate and the color print layer; and
   a touch sensor layer formed over the adhesive layer and configured to sense a touch input,
   wherein at least one groove is formed in the color print layer and extends from the light transmission region to the peripheral region,
   wherein the color print layer includes a first color print layer, a second color print layer formed over the first color print layer, and a third color print layer formed over the second color print layer,
   wherein the groove penetrates the third color print layer, and wherein a bottom surface of the groove is defined by a top surface of the second color print layer and atop surface and sidewalls of the groove are formed in the third color print layer.

6. A display device, comprising:
a touch panel including:
   a substrate including a light transmission region;
   a color print layer formed in the peripheral region and forming a boundary between the light transmission region and the peripheral region;
   an adhesive layer formed over the substrate and the color print layer; and
   a touch sensor layer formed over the adhesive layer, wherein at least one groove is formed in the color print layer and extends from the light transmission region to the peripheral region;
a display panel formed over the touch sensor layer; and
a case housing the touch panel and the display panel,
wherein the color print layer includes a first color print layer; and a second color print layer formed over the first color print layer,
wherein the groove penetrates the second color print layer, and
wherein a bottom surface of the groove is defined by a top surface of the first color print layer and a top surface and sidewalls of the groove are formed in the second color print layer.

7. The display device of claim 6, wherein a cross-section of an inner edge of the first color print layer and an inner edge of the second color print layer form a substantially stepped shape.

8. A display device comprising:
a touch panel including:
   a substrate including a light transmission region;
   a color print layer formed in the peripheral region and forming a boundary between the light transmission region and the peripheral region;
   an adhesive layer formed over the substrate and the color print layer; and
   a touch sensor layer formed over the adhesive layer, wherein at least one groove: is formed in the color print layer and extends from the light transmission region to the peripheral region;
a display panel formed over the touch sensor layer; and
a case housing the touch panel and the display panel,
wherein the color print layer includes a first color print layer, a second color print layer formed over the first color print layer and a third color print layer formed over the second color print layer,
wherein the groove penetrates the third color print layer, and
wherein a bottom surface of the groove is defined by a top surface of the second color print layer and atop surface and sidewalls of the groove are formed in the third color print layer.

9. A display device, comprising:
a touch panel including:
   a substrate including a light transmission region and a peripheral region surrounding the light transmission region;
   a color print layer formed in the peripheral region; and
   a touch sensor layer formed over the color print layer and the substrate and configured to sense a touch input, wherein at least one groove is formed in the color print layer and extends from the light transmission region to the peripheral region; and
a display panel formed over the touch panel,
wherein the color print layer includes a first color print layer and a second color print layer formed over the first color print layer,
wherein the groove penetrates the second color print layer, and
wherein a bottom surface of the groove is defined by a top surface of the first color print layer and a top surface and sidewalls of the groove are formed in the second color print layer.

10. The display device of claim 9, wherein the groove is formed in the second color print layer and wherein the height of the second color print layer is greater than that of the first color print layer.

11. The display device of claim 10, wherein the width of the groove is greater than the height of the color print layer.

* * * * *